Figure 1:
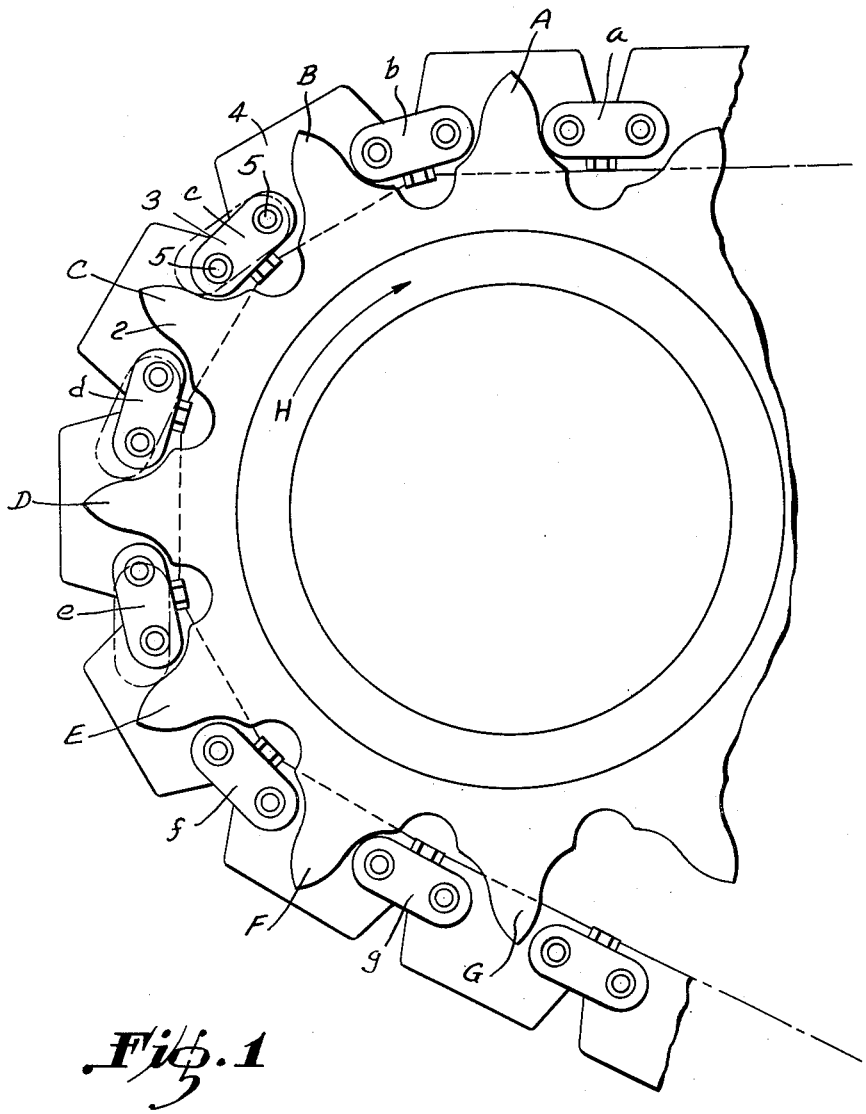

Feb. 6, 1962    K. E. BACKHAUS    3,020,095
TRACK CHAIN FOR VEHICLES
Filed Dec. 15, 1958    2 Sheets-Sheet 1

INVENTOR:
KARL ERWIN BACKHAUS

BY Burgess, Dinklage + Sprung
ATTORNEYS

Feb. 6, 1962 K. E. BACKHAUS 3,020,095
TRACK CHAIN FOR VEHICLES
Filed Dec. 15, 1958 2 Sheets-Sheet 2

INVENTOR
KARL ERWIN BACKHAUS

BY Burgess, Dinklage & Sprung
ATTORNEYS

United States Patent Office 3,020,095
Patented Feb. 6, 1962

3,020,095
TRACK CHAIN FOR VEHICLES
Karl Erwin Backhaus, Remscheid, Germany, assignor to Diehl KG, Remscheid, Germany, a corporation of Germany
Filed Dec. 15, 1958, Ser. No. 780,283
Claims priority, application Germany Dec. 16, 1957
6 Claims. (Cl. 305—57)

The present invention relates to improved track chains, and more particularly to track chains wherein the length of the chain links and accompanying chain link connectors is slightly less than would otherwise be required for normal precise positioning between the corresponding teeth of the driving cog wheel of the track vehicle on which the track chain is mounted.

It is generally well-known in the art that track chains for vehicles gradually increase in length during the normal course of operation. In previous track chain constructions, as for example with new track chains, the initial dimensions of the chain links and the accompanying chain link connectors have been such that upon positioning the track chain on the vehicle, they precisely fit over the cog wheel, each chain link connector being disposed between two adjacent teeth of the cog wheel.

Hence, when so positioned, the trailing edge of first chain link connector of the section of the track chain being conducted over the cog wheel is in driving abutment with the leading edge of the corresponding wheel tooth therebehind, while the second and subsequent chain link connectors are in corresponding driving abutment with the remaining wheel teeth in engagement, respectively. Because of ordinary wear and tear occurring in the course of operation, these track chains stretch somewhat, thereby increasing in length. Notably, the initial dimensions of the individual chain links and chain link connectors become enlarged through the high mechanical forces exerted on these members during use, particularly in braking the vehicle and in driving the vehicle over high grades and mountains, and around curves.

As a result of such lengthening of the track chain, while the trailing edge of the first chain link connector of the section of the track chain being conducted over the cog wheel is in normal driving abutment with the leading edge of the corresponding wheel tooth therebehind, the second and subsequent chain link connectors are increasingly displaced in opposite direction to that in which the track chain travels. Consequently, a lag in the track chain is produced which effects an unequal distribution of force against the chain link connectors in engagement, whereby the forces on the first connector are concentrated and thus heightened and those on the subsequent connectors are increasingly dispersed and thus diminished. In this connection, the subsequent connectors increasingly ride up at their trailing edges upon the leading edges of the corresponding teeth in engagement therewith, so that the accumulated increments of increased length cause the last connector to be displaced almost to the top rim of the corresponding tooth thereat. Under certain circumstances, the last connector may even slide over its corresponding tooth.

It is an object of the invention to overcome the foregoing drawbacks and to provide a track chain construction whereby the increases in length of the track chain parts which occur during normal operation of the vehicle will be off-set and counterbalanced.

Figure 2:
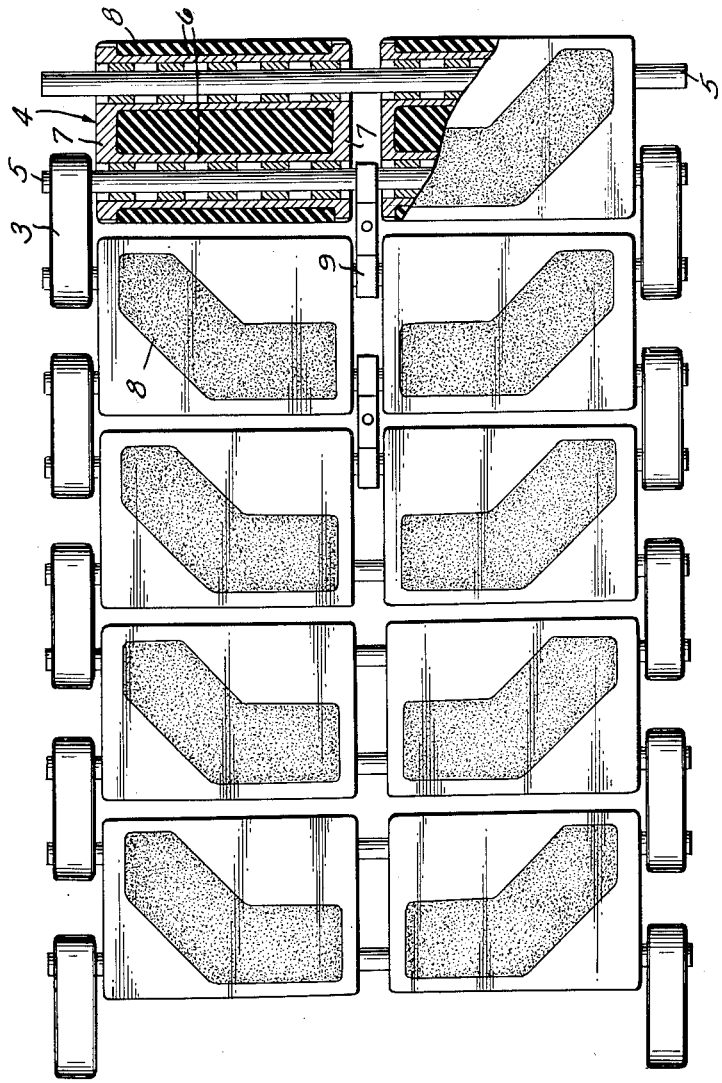

Other and further objects of the invention will become apparent from a study of the within specification and accompanying drawings, in which:

FIG. 1 shows a track chain in accordance with an embodiment of the invention, indicating schematically in broken line the disposition of chain link connectors in an elongated track chain of the prior art, and FIG. 2 illustrates a bottom view partially broken away to indicate details of construction of a track chain in accordance with the invention.

It has been discovered in accordance with the present invention that the lengthening and elongation of track chains for vehicles as hereinabove described, which leads to increased wear and accelerated replacement of these track chains and cog wheels, may be avoided by constructing the length of the individual track chain links and/or chain link connectors of slightly smaller linear dimensions than would normally precisely correspond to a cog wheel, having teeth with a given interval of distance therebetween, with which the track chain will engage. The overall determination of the diminution in individual dimensions of the members of the initial track chain in accordance with the invention is based upon the requirement that the trailing edge of the first connector in engagement with the cog wheel will abut the leading edge of the corresponding tooth therebehind while the leading edge of the last connector in engagement with the cog wheel will abut the trailing edge of the corresponding tooth thereahead. In this manner, not only the track chain in initial unlengthened condition, but also the track chain lengthened under ordinary wear and tear a substantial degree, will opreate favorably in engagement with the cog wheel, without objectionable riding up of the connectors over the leading edges of corresponding wheel teeth therebehind or accelerated wearing of the parts through excessive forces.

If the increment of diminution of the length of each of the links and connectors, in contrast to the usual length of these parts in conventional track chain vehicles, is taken as $dx$, the tolerance of a single connector between two teeth is taken as $a$, and the number of chain link connectors in engagement at one time is taken as $n$, then the aforementioned conditions are fulfilled when:

$$dx = \frac{a}{n}$$

A study of FIG. 1 will reveal the relationship defined by this formula.

Referring to the drawing, FIG. 1 shows a track chain comprising chain links 4 and connectors 3 articulatedly connected along the track chain by pins 5. A portion of the endless track chain is positioned in engagement with a portion of driving cog wheel 1 and abutting teeth 2 integrally arranged on said wheel.

FIG. 1 illustrates in broken line the positioning on the cog wheel of individual chain link connectors of a conventional track of usual initial precise dimensions which has become lengthened and elongated during use. In normal operation, as the wheel rotates in the direction of the arrow H, the trailing edge of the first connector $a$ abuts the leading edge of the tooth A in the usual way, and if the linear dimensions of the track chain parts correspond precisely to the dimensions of the cog wheel, the subsequent chain links and connectors will also abut their corresponding teeth. Thus, the trailing edge of connector $b$ abuts the leading edge of tooth B, the trailing edge of connector $c$ abuts the leading edge of tooth C, etc.

However, if the chain lengthens with use, the corresponding chain links and connectors becoming somewhat elongated, this difference in length while not appreciable in the case of connector $b$, is evident in the case of connector $c$, which begins to ride up at its trailing edge along the leading edge of tooth C as depicted in broken line in FIG. 1. This riding up action increases accordingly at each subsequent connector, even to connector $f$, where the riding up action is greatest. The broken line position for connector f, however, is not shown in the drawing.

Contrastly, the solid line portions of FIG. 1 show the position occupied by the track chain in engagement with the cog wheel in accordance with the invention. As is easily noted, the diminution of the length of the individual chain links causes the second and subsequent connectors to become increasingly spaced at their trailing edge from the corresponding leading edge of the respective wheel teeth. The last connector g in engagement with the wheel is seen to be positioned with its trailing edge so spaced from the leading edge of the tooth G, that the leading edge of connector g abuts the trailing edge of tooth F located ahead of it. Thus, during rotation around the cog wheel the connectors shift between the gap intervals between adjacent teeth in the clearance provided because of the desirably diminished length of the chain, so that the chain links coming into engagement with the cog wheel at the bottom pass along the wheel in suitable engagement.

FIG. 2 shows a view of the bottom of a track chain assembly of the invention including connectors 3 and chain links 4 connected by pins 5. Chain links 4 are shown as substantially rectangular steel frames comprising two pipe elements 6, 6 secured together by bridge flanges 7, 7. This chain link frame carries a rubber riding tread 8 which engages the ground under traction during travel of the vehicle. Disposed between adjacent track chains are guide spurs 9 through which pins 5 are passed for reinforced connection of links 4 and connectors 3 on either side.

By slightly shortening the linear dimensions of the chain links and/or chain link connectors in accordance with the invention, track chains are produced which will constantly correctly engage the cog wheel and properly abut the teeth thereon, whether the track chain is in initial slightly shortened condition or lengthened or elongated a substantial degree. This advantageous operation will be effected, accordingly, without the occurence of excessively high forces acting between the wheel teeth and the members of the track chain, and without the connectors riding up on the adjacent abutting edges of the wheel teeth in consequence of such forces.

In this manner, a higher degree of operational safety and dependability as well as a longer effective life of the chain parts and cog wheels will be attained, whereby greater economy and efficiency will result.

While the specification and accompanying drawings have been set forth for the purpose of illustration, it will be readily understood by those in the art, that various modifications and changes may be made, without departing from the spirit and scope of the invention which is to be limited only by the appended claims.

I claim:

1. A track chain for vehicles comprising a plurality of interconnected chain link means and longitudinally extending chain link connector means in alternately repeated order along the track path, the linear dimensions of at least one of said means being slightly less than the corresponding distance between the respective teeth means of a driving wheel means over which said track chain is conducted and the linear distance between one point on one said means in repeated order and the corresponding point on that next adjacent thereto is slightly less than the linear distance between one point on one said teeth means and the corresponding point on that next adjacent thereto.

2. A track chain according to claim 1 wherein the linear dimensions of both the chain link means and the chain link connector means are slightly less than the corresponding distance between the respective teeth means of a driving wheel means over which said track chain is conducted.

3. In a track chain vehicle, having driving wheel means with teeth means provided thereon and track chain means including chain link means interconnected with chain link connector means longitudinally extending in alternately repeated order along the track path, the improvement which comprises providing at least one of said link means and said connector means with linear dimensions which are slightly less than the corresponding gap distance between the respective teeth means of said driving wheel means with which said means is in engagement and over which said track chain means is conducted and the linear distance between one point on one said means in repeated order and the corresponding point on that next adjacent thereto is slightly less than the linear distance between one point on one said teeth means and the corresponding point on that next adjacent thereto, whereby a clearance is formed between the linear dimension of each of said means and the corresponding adjacent teeth means intermediate which said means is situated.

4. In a track chain vehicle having a driving wheel provided with a plurality of driving teeth thereon and a rubber tread track chain assembly including a corresponding plurality of chain link members and longitudinally extending chain link connector members interconnected in an endless track chain in alternately repeated order, the improvement which comprises providing at least one of said chain link and said connector members with linear dimensions which are slightly less than the corresponding gap distance between the respective teeth of said wheel over which said track chain is conducted during driving engagement and the linear distance between one point on one said member in alternately repeated order and the corresponding point on that next alternately adjacent thereto, slightly less than the linear distance between one point on one of said teeth and the corresponding point on that next adjacent thereto, whereby a clearance is formed between the linear dimension of each said alternately repeated member and the corresponding adjacent teeth intermediate which the said member is situated and the forces occurring in normal operation will be evenly absorbed by said track even after a substantial degree of elongation of the track chain.

5. Improvement according to claim 3 wherein said linear dimensions of said means are so determined that with respect to the forward direction of movement of said means at any one time the trailing edge of the most forward of said means in engagement with said wheel means abuts the leading edge of the corresponding teeth means therebehind and the leading edge of the most rearward of said means in engagement with said wheel means abuts the trailing edge of the corresponding teeth means therebefore.

6. Improvement according to claim 3 wherein the sum of the diminution of each of said linear dimensions with respect to the gap distance between respective teeth means is determined by taking n times the formula $$dx = \frac{a}{n}$$

wherein a is the clearance of each of the diminished linear dimensioned means between two adjacent teeth means and n is the number of said diminished linear dimensioned means in simultaneous engagement with said wheel means, during operation.

References Cited in the file of this patent

UNITED STATES PATENTS 2,529,168   Marshall et al.           Nov. 7, 1950
2,854,294   Bannister               Sept. 30, 1958